United States Patent [19]
Quoirin et al.

[11] Patent Number: 6,107,664
[45] Date of Patent: *Aug. 22, 2000

[54] SELF-LOCKING STATIC MICRO-CIRCUIT BREAKER

[75] Inventors: Jean-Baptiste Quoirin, Tours; Jean Jalade, Castanet-Tolosan; Jean-Louis Sanchez, Escalquens; Jean-Pierre Laur, Albi, all of France

[73] Assignee: SGS-Thomson Microelectronics S.A., Gentilly, France

[*] Notice: This patent issued on a continued prosecution application filed under 37 CFR 1.53(d), and is subject to the twenty year patent term provisions of 35 U.S.C. 154(a)(2).

[21] Appl. No.: 08/891,774

[22] Filed: Jul. 14, 1997

[30] Foreign Application Priority Data

Jul. 16, 1996 [FR] France .................... 96 09132

[51] Int. Cl.⁷ .................................. H01L 23/62
[52] U.S. Cl. ................. 257/355; 257/174; 257/368; 257/392; 257/393; 257/402; 257/403
[58] Field of Search ................... 257/355, 368, 257/392–3, 402–3, 173, 174

[56] References Cited

U.S. PATENT DOCUMENTS

| | | | |
|---|---|---|---|
| 5,045,902 | 9/1991 | Bancal | 257/403 |
| 5,128,823 | 7/1992 | Fujimoto et al. | 327/387 |
| 5,724,218 | 3/1998 | Tihanyi | 361/79 |

FOREIGN PATENT DOCUMENTS

| | | | |
|---|---|---|---|
| 0 675 584 | 10/1995 | European Pat. Off. | H02H 9/04 |
| 0 684 677 | 11/1995 | European Pat. Off. | H02H 3/08 |

*Primary Examiner*—J. Carroll
*Attorney, Agent, or Firm*—Wolf, Greenfield & Sacks, P.C; James H. Morris; Theodore E. Galanthay

[57] ABSTRACT

A static self-locking micro-circuit-breaker includes a first MOS depletion transistor of a first type connected by its drain to a first main terminal and by its gate to a second main terminal, a second MOS depletion transistor of second type connected by its drain to the second main terminal and by its source to the source of the first transistor, a third MOS depletion transistor of the first type connected by its drain to the first main terminal, by its gate to the second main terminal, and by its source to the gate of the second transistor.

25 Claims, 2 Drawing Sheets

SELF-LOCKING STATIC MICRO-CIRCUIT BREAKER

BACKGROUND OF THE INVENTION

1. Field of the Invention

The present invention relates to the field of semiconductor components and more specifically medium to high power components.

2. Discussion of the Related Art

In this field, components meant to be arranged in series with a load and having a function of limiting a current in the load to a maximum predetermined value are known. For this purpose, a MOS depletion transistor having its gate connected to its source, for example, is used. Components operating as circuit-breakers also are known.

Unpublished French patent application No. 95/15508 of Dec. 20, 1995, filed by the present Applicant, describes a static and monolithic component operating both as a current limiter and as a circuit-breaker. Such a component allows a current with a limited value to flow through, so long as a voltage at its terminals does not exceed a predetermined triggering threshold, and interrupts the current flow beyond the triggering threshold. This component is self-restarting, that is, it resumes operation as a current limiter again as soon as the voltage at its terminals goes below a predetermined triggering threshold.

The component of the above-referenced French application exhibits an operational characteristic as shown in FIG. 1. As long as the voltage at its terminals is lower than a switch-off voltage VD, the current is limited to a substantially constant value Ion. As soon as the voltage across the component exceeds the switch-off voltage VD, the current falls to a break current value Ioff which is lower with respect to Ion, whereby the current through the circuit including the component is substantially interrupted.

The above-mentioned French application provides two architectures to reach the desired result, shown as blocks in FIGS. 2A and 2B.

The component of FIG. 2A is meant to be connected between terminals A and K, a first terminal or anode terminal A being positive with respect to a second terminal or cathode terminal K. It includes, between these two terminals A, K, a current limiter 1 and a voltage sensor 2. The voltage sensor is, for example, a voltage divider which supplies, on a terminal C, a control voltage VC when the voltage between terminals A and K reaches the switch-off value VD. The control voltage VC controls current limiter 1 to inhibit its operation, that is, to make it blocking.

In the embodiment illustrated in FIG. 2B, voltage sensor 2 turns off a switch 3, in series with limiter 1, when the voltage between terminals A and K reaches switch-off value VD.

The above-mentioned French patent application describes embodiments of the voltage sensor wherein the sensor comprises a voltage divider 2 including two depletion N-channel MOS transistors connected in series and operating as non linear resistors. Each of these MOS transistors has its gate connected to its source.

It is indicated that, during cut-off phases, break current Ioff mainly corresponds to the current through detector 2.

This non-zero break current often is not a disadvantage for the desired function, so long as it is low enough, since it can in particular be used as a detection signal after the triggering of the circuit-breaker.

However, it is desired in some applications to have a break current Ioff with a zero intensity, and this all the more as, beyond voltage VD, conversely to what is schematically shown in FIG. 1, current Ioff increases with the voltage.

SUMMARY OF THE INVENTION

Thus, an object of the present invention is to implement a static and monolithic current limiter and circuit-breaker component which has a very high series impedance in the switch-off state.

To achieve this object, as well as others, the present invention provides a micro-circuit-breaker component including a first MOS depletion transistor of a first type connected by its drain to a first main terminal and by its gate to a second main terminal, a second MOS depletion transistor of a second type connected by its drain to the second main terminal and by its source to the source of the first transistor, and a third MOS depletion transistor of the first type connected by its drain to the first main terminal, by its gate to the second main terminal, and by its source to the gate of the second transistor.

According to an embodiment of the present invention, the first and third MOS depletion transistors are of an IGBT type.

According to an embodiment of the present invention, the component further includes a Zener diode connected between the gate and the drain of the second transistor.

According to an embodiment of the present invention, the first and third MOS transistors are of a vertical type and the second one is of a lateral type.

According to an embodiment of the present invention, the component is implemented in an N-type silicon substrate.

Compared with the solution described in the above-mentioned French patent application, it should be noted that, according to the present invention, the limiter, sensor and circuit-breaker functions are fabricated with the same components, the switch-off threshold being determined by a MOS transistor threshold voltage.

These objects, characteristics and advantages as well as others, of the present invention, will be discussed in detail in the following non-limiting description of a specific embodiment in relation to the accompanying drawings.

DETAILED DESCRIPTION

Figure 3:
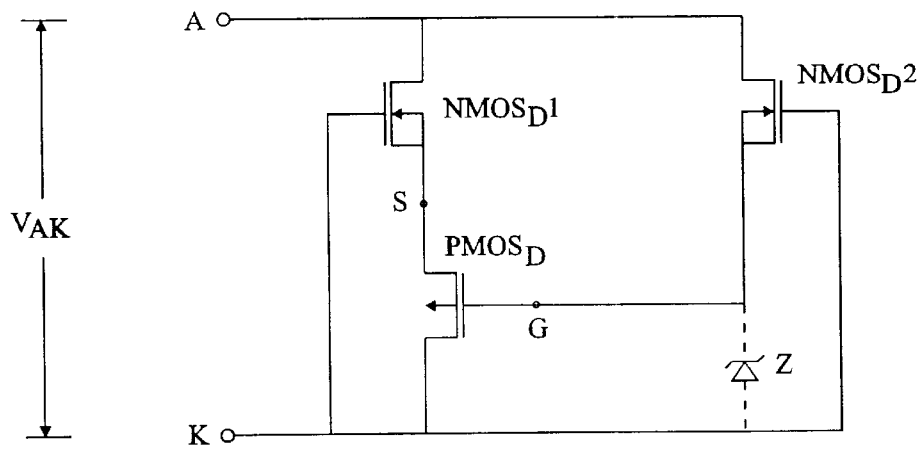
FIG. 3 shows a diagram of a limiter-circuit-breaker component according to the present invention.

A component according to the present invention implements the circuit as illustrated in FIG. 3 which is meant to be connected to two terminals A and K, terminal A being positive with respect to terminal K.

Two depletion N-channel MOS transistors $NMOS_D1$ and $NMOS_D1$ have their drains connected to terminal A and their gates connected to terminal K. A P-channel MOS transistor $PMOS_D$ has its source connected to the source of transistor $NMOS_D1$, its gate connected to the source of transistor $NMOS_D2$ and its drain connected to terminal K. A substrate of transistor $PMOS_D$ is floating, which enables, during its on and off phases, it to set its potential in a vicinity of the drain voltage, by using a self-shielding phenomenon obtained in a multicellular MOS-type integrated structure.

Thus, it can be considered that transistor $NMOS_D1$ has its source connected to its gate through transistor $PMOS_D$ and that transistor $PMOS_D$ has its gate connected to its source through transistors $NMOS_D2$ and $NMOS_D1$.

Figure 1:
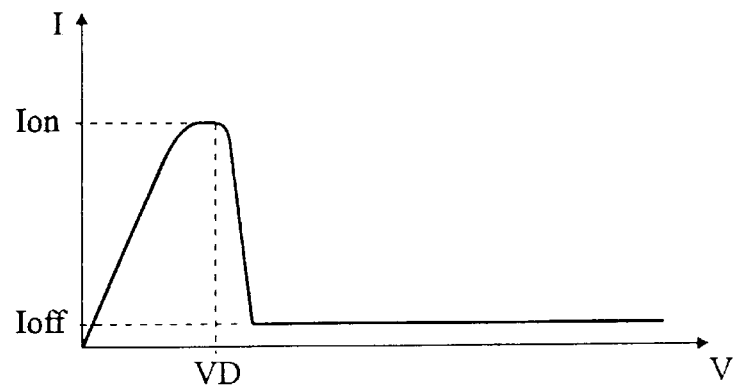
FIG. 1 shows the current-voltage characteristic of a limiter-circuit-breaker device.
Figures 2A, 2B:
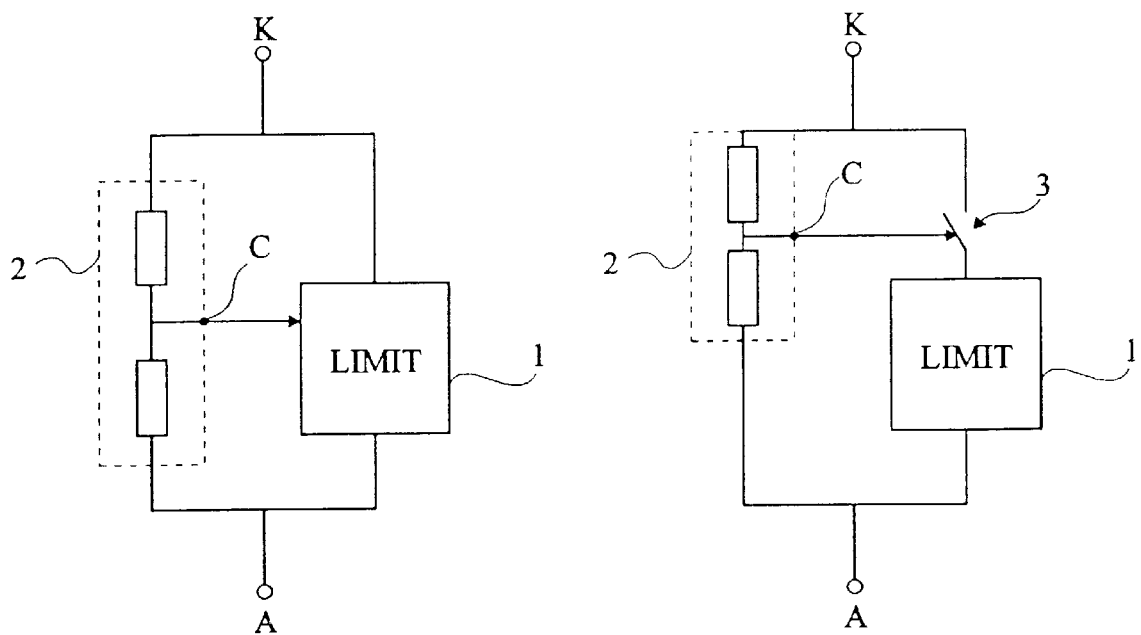
FIGS. 2A and 2B are two block diagrams illustrating two examples of a general architecture of a limiter-circuit-breaker device.

The circuit of FIG. 3 goes through three operating phases which substantially correspond to that shown in FIG. 1.

In a first phase, depletion transistors $NMOS_D1$ and $PMOS_D$ operate as two series resistors having low values, and the current increases proportionally to the voltage until it reaches a value Ion.

In a second phase, one or the other of transistors $NMOS_D1$ and $PMOS_D$ saturates and limits the current value to above-mentioned value Ion.

In a third phase, a switch-off state is reached. Then, transistor $NMOS_D2$ blocks in its turn. To explain the beginning of a switch-off phase, one has to distinguish a first case where transistor $NMOS_D1$ first saturates from a second case where transistor $PMOS_D$ first saturates. For a given circuit-breaker, this selection is performed in the designing stage by setting physical and technological parameters of a channel region between the two devices.

In the first case where transistor $NMOS_D1$ saturates first, when voltage $V_{AK}$ further increases, a stage is reached where a voltage VG on the gate of transistor $PMOS_D$ (which is substantially equal to the potential of terminal A since transistor $NMOS_D2$ is a depletion transistor which is conductive at that time) becomes higher than the threshold voltage defined between the gate and the substrate of the transistor. As previously indicated, the substrate voltage is, in such conditions, close to the drain voltage (point K). Thus, transistor $PMOS_D$ blocks. The source-drain voltage then increases, thereby increasing the potential of a node S. When a voltage at node S becomes higher than the threshold voltage of transistor $NMOS_D1$, the latter also blocks. When the anode-cathode voltage $V_{AK}$ keeps on increasing a source potential of transistor $NMOS_D2$ increases with this value (minus a voltage drop in transistor $NMOS_D2$). Thus, transistor $NMOS_D2$ also blocks when a source-gate voltage applied thereto becomes equal to its threshold voltage. Clearly, the threshold voltage of transistor $NMOS_D2$ has to be higher than that of the two other transistors. In this configuration, the three transistors are blocked and, in principle, no leakage current flows through the circuit-breaker. If, however, a current due to a variation $dV_{AK}/dt$ and/or a leakage current under the threshold are present in transistor $NMOS_D2$, it is advisable to place a Zener diode as indicated in FIG. 3 to protect the gate of transistor $PMOS_D$.

In the second case where transistor $PMOS_D$ first saturates, when the potential on terminal A further increases, a potential VS at the source S of transistor $NMOS_D1$ becomes higher than a gate potential of the transistor. When a difference therebetween exceeds the threshold voltage of transistor $NMOS_D1$, this transistor blocks. When voltage $V_{AK}$ still increases, the potential of point G increases as well, and transistor $PMOS_D$ blocks, in its turn, for the same reasons as previously. Transistors $NMOS_D1$ and $PMOS_D$ are blocked and transistor $NMOS_D2$ also blocks, since voltage VAK further increases and the source potential of transistor $NMOS_D2$ reaches a value such that its source-gate voltage becomes equal to, and then higher than, its threshold voltage. Naturally, the precautions previously taken for the threshold voltages and the envisaged protections remain necessary.

The circuit according to the present invention is likely to have various alterations and modifications which will occur to those skilled in the art. In particular, it should be understood that the operation of the circuit remains the same when transistors $NMOS_D1$ and $NMOS_D2$ are replaced with IGBT transistors.

Figure 4:
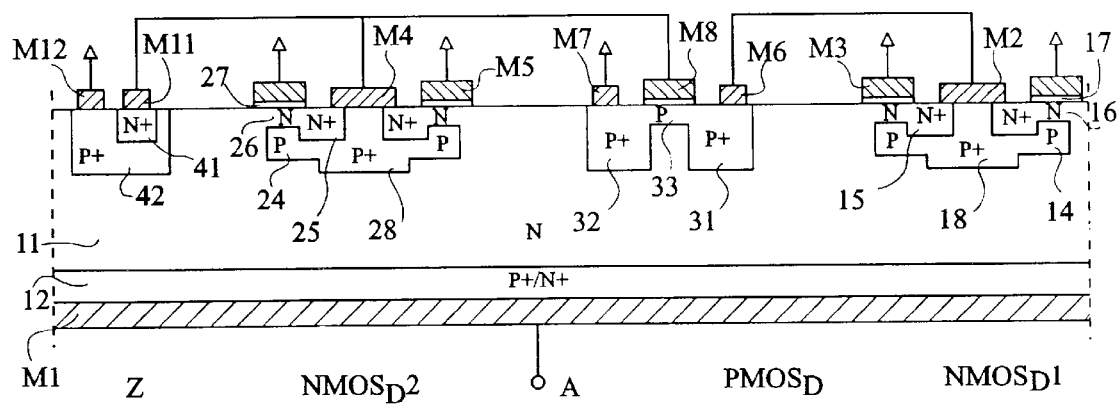
FIG. 4 shows an example of an embodiment of the limiter-circuit-breaker component according to the present invention.

FIG. 4 shows an example of a monolithic embodiment of the circuit of FIG. 3.

As usual, FIG. 4 being a cross-sectional view of a component is not to scale. Those skilled in the art will refer to their general knowledge to determine thicknesses and doping levels of the different layers. The surfaces occupied by these various layers or the number of cells constituting a primary electronic component will be, as is known, chosen according to the technology used and the power dissipation imperatives. Similarly, distances between the several P wells will be optimized in order to ensure a self-shielding effect.

In FIG. 4, a cell of a vertical MOS transistor constituting transistor $NMOS_D1$, a lateral MOS transistor constituting transistor $PMOS_D$, a cell of a vertical MOS transistor constituting transistor $NMOS_D2$, and a Zener diode Z, respectively from right to left, have been shown conventionally and schematically.

Vertical MOS transistor $NMOS_D1$ is formed in an N-type silicon wafer 11 having a low doping level, including on its rear surface side a highly-doped N-type layer 12 enabling implementation of an ohmic contact with an anode metallization M1 covering the rear surface. Transistor $NMOS_D1$ includes one or several cells, each of which is formed in a lightly-doped P-type well 14 having, for example in top view, a hexagonal or square shape. On an upper surface side of well 14 is formed an $N^+$-type region or well 15 substantially in a shape of a ring. An upper part of the well 14 between an outer circumference of the well 15 and an outer circumference of the well 14 is occupied by a lightly-doped N-type region 16 covered with a gate insulator 17. A center part of the well 14 generally corresponds to a more strongly-doped P-type region 18. An upper surface of a region 18 and of at least a portion of the ring 15 is coated with a metallization M2. The gate insulator 17 is coated with a metallization M3.

Rear surface metallization M1 corresponds to the drains of the MOS transistors, connected to terminal A, and metallization M2 constitutes, above region 15, the source contact and, above region 18, the substrate contact.

Transistor $NMOS_D2$ is implemented as transistor $NMOS_D1$ and includes regions 24 to 28 respectively corresponding to regions 14 to 18 and metallizations M4 and M5 corresponding to metallizations M2 and M3. Of course, transistor $NMOS_D2$ which does not have the function of conducting current will have a much smaller surface area than that of transistor $NMOS_D1$.

These components are likely to have various alternative embodiments well known by those skilled in the art. In particular, the highly-doped N-type rear surface semiconductor layer 12 can be replaced with a highly-doped P-type layer. So-called insulated gate bipolar transistor (IGBT) depletion ($IGBT_D$) components are then obtained.

Lateral transistor $PMOS_D$ includes two highly-doped diffused regions 31 and 32 separated by a lightly-doped P-type region 33 (channel region). Metallizations M6 and M7 are respectively formed on regions 31 and 32 and a gate metallization M8 is formed above the channel region 33 (with an interposed insulating layer).

Zener diode Z can be comprised of an $N^+$ region 41 formed in a $P^+$ well 42, region 41 being coated with a metallization M11 and region 42 being coated with a metallization M12. Metallizations M2 and M6 are interconnected and correspond to the connection of the sources of transistors $NMOS_D1$ and $PMOS_D$. Metallizations M8, M4 and M11 are interconnected and correspond to the connection of the gate of transistor $PMOS_D$ with the source of transistor $NMOS_D2$ and with the cathode of Zener diode Z. The other metallizations are connected to terminal K, as indicated by an arrow.

NUMERIC EXAMPLE

As a non-limiting example of the present invention only, numeric values applicable to the structure schematically shown in FIG. 4 will be indicated hereafter.

This structure can be formed from an N-type silicon wafer in a plane <100> having a sheet resistance of 30 ohm.cm.

If the superficial concentration of a region is called Cs, and the junction depth is called xj, the following parameters can be chosen for the various regions.

|  | Cs (at/cm³) | xj (μm) |
|---|---|---|
| P⁺ regions | $1.1 \times 10^{19}$ | 4.35 |
| P regions | $2 \times 10^{17}$ | 2.5 |
| N⁺ regions | $6 \times 10^{9}$ | 1.15 |
| N channels | $3 \times 10^{16}$ |  |

The gate widths can be approximately 50 nm. The horizontal dimensions of the wells are those currently chosen in the field of MOS power transistors, that is, approximately 25 to 50 μm. With such parameters, devices bearing voltages from 600 to 1500 V are obtained, the current Ion of which is from 1 to 5 A, and the current Ioff of which is close to zero.

Of course, as has already been indicated in this description, each of the components described as an example is likely to have several alternatives, and may be comprised of one or several cells.

Such alterations, modifications, and improvements of the present invention are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A micro-circuit-breaker component, including:
    a first MOS depletion transistor of a first type including a drain directly connected to a first main terminal and a gate directly connected to a second main terminal,
    a second MOS depletion transistor of a second type including a drain directly connected to the second main terminal and a source directly connected to a source of the first transistor, and
    a third MOS depletion transistor of the first type including a drain directly connected to the first main terminal, a gate directly connected to the second main terminal, and a source directly connected to a gate of the second transistor.

2. The component according to claim 1, wherein the first and third MOS depletion transistors are each of an IGBT type.

3. The component according to claim 1, further including a Zener diode connected between the gate and the drain of the second transistor.

4. The component according to claim 1, wherein the first and third MOS transistors are of a vertical type and the second MOS transistor is of a lateral type.

5. The component according to claim 4, wherein the first, second and third MOS depletion transistors are implemented in an N-type silicon substrate.

6. The component according to claim 5, wherein the first and third transistors are each a vertical transistor; and
    the second transistor is a lateral transistor.

7. The component according to claim 6, further comprising:
    a Zener diode connected between the gate and the drain of the second transistor.

8. A semiconductor device for limiting current flow, comprising:
    a substrate of a first type including first and second surfaces;
    a first MOS depletion transistor of the first type disposed in the first surface of the substrate;
    a second MOS depletion transistor of a second type disposed in the first surface of the substrate, a source of the second transistor directly connected to a source of the first transistor and a drain of the second transistor directly connected to a gate of the first transistor; and
    a third MOS depletion transistor of the first type disposed in the first surface of the substrate, a source of the third transistor directly connected to a gate of the second transistor, a gate of the third transistor directly connected to the drain of the second transistor and a drain of the third transistor directly connected to the drain of the first transistor.

9. The semiconductor device as recited in claim 8, wherein the first transistor comprises:
    a first lightly-doped well of the second type having a more strongly doped center region;
    a first highly-doped region of the first type disposed on an upper surface side of the first lightly-doped well of the second type;
    a first lightly-doped region of the first type disposed on the upper surface side of the first lightly-doped well of the second type between an outer circumference of the first highly-doped region of the first type and an outer circumference of the first lightly-doped well of the second type; and
    a gate insulator disposed over the first lightly-doped well of the first type.

10. The semiconductor device as recited in claim 8, wherein:
    a first surface area of the first transistor is larger than a second surface area of the second transistor.

11. The semiconductor device as recited in claim 8, wherein the second transistor comprises:
    first and second highly doped regions of the second type; and
    a lightly-doped channel region of the second type between the first and second highly doped regions to separate one from the other.

12. The semiconductor device as recited in claim 8, wherein the first and third transistors are each vertical transistors.

13. The semiconductor device as recited in claim 12, wherein the second transistor is a lateral transistor.

14. The semiconductor device as recited in claim 8, further comprising:
    a Zener diode disposed in the first surface of the substrate, the Zener diode connected between the drain and gate of the second transistor.

15. The semiconductor device as recited in claim 14, further comprising:

a first terminal connected to the drain of the first transistor; and a second terminal connected to the drain of the second transistor.

16. The semiconductor device as recited in claim 8, further comprising:

a first layer, highly doped with ions of the second type, disposed on the second surface of the substrate; and a metallization layer disposed on the first layer.

17. The semiconductor device as recited in claim 16, wherein:

the first layer is a highly-doped N-type layer.

18. A method of manufacturing, in a semiconductor substrate of a first type, a device for limiting current, the method including steps of:

(a) forming a first MOS depletion transistor of the first type in an upper surface of the semiconductor substrate;

(b) forming a second MOS depletion transistor of a second type in the upper surface of the semiconductor substrate, a source of the second transistor directly connected to a source of the first transistor and a drain of the second transistor directly connected to a gate of the first transistor; and (c) forming a third MOS depletion transistor of the first type in the upper surface of the substrate, a source of the third transistor directly connected to a gate of the second transistor, a gate of the third transistor directly connected to the drain of the second transistor and a drain of the third transistor directly connected to the drain of the first transistor.

19. The method of manufacturing as recited in claim 18, further including steps of:

forming a first layer highly doped with ions of the second type on a lower surface of the substrate; and forming a metallization layer on the first layer.

20. The method as recited in claim 18, further including steps of:

forming a Zener diode in the upper surface of the substrate; and connecting the Zener diode between the drain and gate of the second transistor.

21. The method as recited in claim 18, wherein step (a) includes a step of:

forming the first transistor as a lateral transistor.

22. The method as recited in claim 18, wherein step (b) includes a step of:

forming the second transistor as a lateral transistor.

23. A circuit for limiting current flow, the circuit comprising:

a first MOS depletion transistor of a first type;

a second MOS depletion transistor of a second type, a source of the second transistor directly connected to a source of the first transistor and a drain of the second transistor directly connected to a gate of the first transistor; and a third MOS depletion transistor of the first type, a source of the third transistor directly connected to a gate of the second transistor, a gate of the third transistor directly connected to the drain of the second transistor and a drain of the third transistor directly connected to the drain of the first transistor.

24. The circuit as recited in claim 23, further comprising:

a Zener diode connected between the gate and the drain of the second transistor.

25. The circuit as recited in claim 24, further comprising:

a first terminal connected to the drain of the first transistor; and a second terminal connected to the drain of the second transistor.

* * * * *